No. 611,746. Patented Oct. 4, 1898.
C. WINTER.
BEEHIVE.
(Application filed Dec. 22, 1896.)
(No Model.) 2 Sheets—Sheet 1.
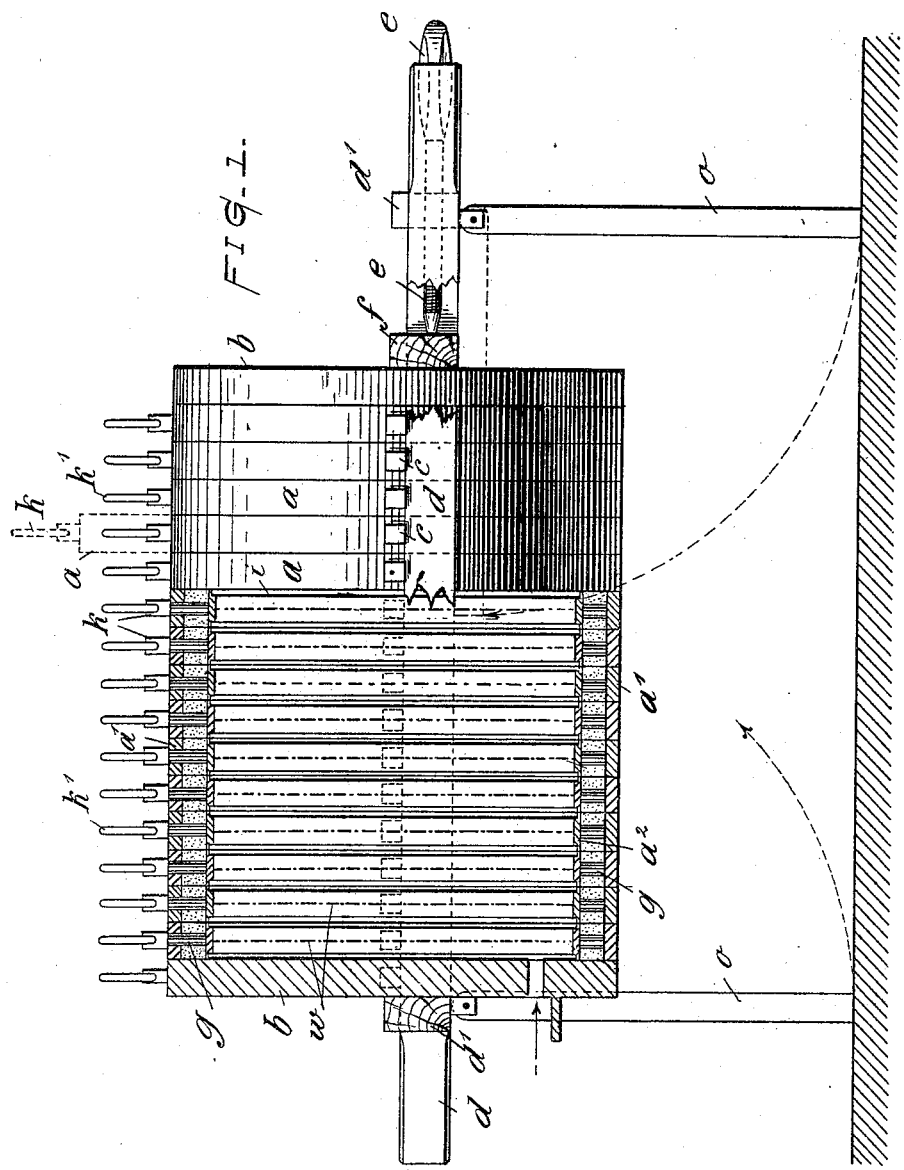
Witnesses:
Inventor:
Carl Winter No. 611,746. Patented Oct. 4, 1898.
C. WINTER.
BEEHIVE.
(Application filed Dec. 22, 1896.)
(No Model.) 2 Sheets—Sheet 2.
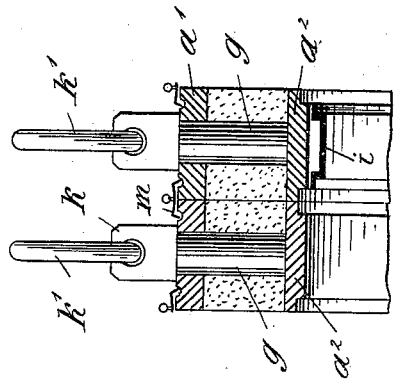
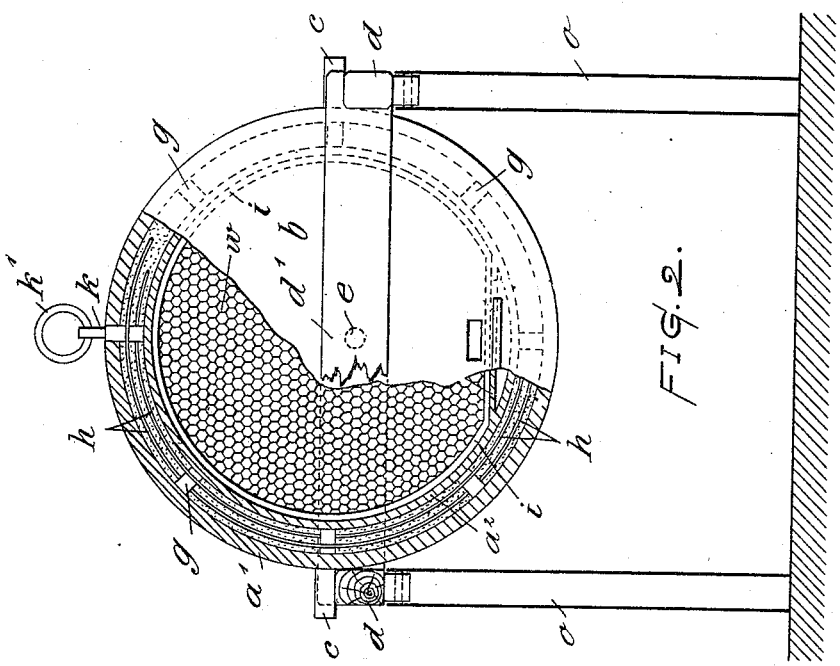
Witnesses.
E. B. Bolton
Inventor:
Carl Winter
By
his Attorneys.

UNITED STATES PATENT OFFICE.

CARL WINTER, OF MANSFELD, GERMANY.

BEEHIVE.

SPECIFICATION forming part of Letters Patent No. 611,746, dated October 4, 1898.

Application filed December 22, 1896. Serial No. 616,674. (No model.)

*To all whom it may concern:*

Be it known that I, CARL WINTER, a subject of the King of Prussia, German Emperor, and a resident of Mansfeld, Kingdom of Prussia, Germany, have invented certain new and useful Improvements in Beehives, of which the following is a specification.

The honeycombs of this beehive are contained in rings or frames which are placed alongside each other to form the walls of the hive. The taking out or putting in of one of the rings with a honeycomb may be done without disturbing the remaining combs.

In the accompanying drawings one mode of construction of the present beehive is shown in Figure 1 in a side view, partly in cross-section, in Fig. 2 in a vertical cross-section, and in Fig. 3 in a detail of construction.

The rings or frames $a$, Fig. 1, forming the walls of the hive and placed beside each other with the two end covers $b$, rest upon the bars $d$ of a supporting-frame by means of radial pegs $c$. The whole frame may be pressed together by means of a screw $e$ and a movable cross-bar $f$ against the end bar $d'$, whereby a very tight connection between the frames is established.

Each ring forms a part of the wall of the hive, and in order to serve as a protection against cold or heat they have a convenient thickness, or, as shown in the drawings, are formed hollow. In the drawings each of the rings $a$ is shown as consisting of an outer ring $a'$ and an inner ring $a^2$, connected by radial stays $g$. The rings form thereby a hollow space which may remain empty, the inclosed air thereby serving as a poor conductor of heat, or the space may be filled by a heat-insulator—as dry turf, excelsior, or the like—which latter may be made more solid by treatment with a sticky substance. In order to make this insulating material still more solid, switches $h$ may be wound around the stays $g$, as shown in Fig. 2. It is understood also that the covers $b$ may be protected in a similar way against temperature differences.

The beehive is divided into two parts—one front, adjoining the entrance, used for brood-room. In the brood-room the combs $w$ join the outer frame, (wall-frame,) so that they remain in constant connection, and can be removed in case of necessity, together with the wall-frame, from one hive into another. In the honey-room, to the contrary, there remains between each walling and the appertaining honey-cells a space of about one centimeter. In the brood-room the honey-cells are fastened to the wall-frame by means of glue, nails, or such, while those in the honey-room are placed on hinges.

Each of the rings contains a honeycomb $w$. In the brood place this comb may be built directly to the rings. In the honey place this comb may be built, preferably, to a separate frame $i$, which is fitted into the inner ring $a^2$, and may be used for transportation of the combs.

If it should be necessary to remove any of the combs from the hive, it is only necessary to loosen the screw $e$ to separate the required ring from the others by driving wedges between the pegs $c$. If this is done, the isolated ring may now be lifted by means of the rings $k'$ of the pegs $k$ and removed from the series, whereby any of the combs may be manipulated and treated without disturbing the connection of the remaining combs. A removal, exchange, or addition of combs may take place in this way at any convenient point of the frame and the work of the bee-master is considerably facilitated. Should the bees have tightened the rings with wax, a knife may be inserted between two adjoining rings, but only so far as corresponding with the thickness of the walls, so it may not reach into the space $l$ and there injure the bees.

By exact workmanship and under the action of the pressing-screw $e$ the rings fit to each other so tight that the joints may be considered as fully protected against the influence of the weather, especially if tightened with wax.

In order to give complete security against the ingress of moisture, the joints may be especially protected. As shown in Fig. 3, this may be done by means of removable tin strips $m$, forming separated rings, the downwardly-bent edges of which may conveniently engage in annular grooves $n$ on the circumference of the rings $a$. For taking out one of the frames $a$ the corresponding tin strips $m$ must be removed. The water running off the tin strips may quickly be carried off to the lowest point of the rings, so that no water whatever can enter the joints.

The tin strips $m$ may be applied only to the upper half of the rings and may be grooved themselves, so that the rain may easily run off.

Iron stands or legs $o$ are hinged to the frame $d$.

It is understood that the shape of the rings $a$ need not be necessarily round or circular, but may have any convenient form, as polygonal, oval, &c., without thereby departing from the scope of the present invention.

I claim—

1. A beehive comprising a series of rings or sections constituting the inclosing casing, each ring being made up of an inner and an outer annular wall providing a space between them with means for connecting the rings and spacing them apart and means for removably holding the sections in place in the hive, substantially as described.

2. In combination in a beehive, a supporting-frame comprising the parallel side bars, a series of rings or sections constituting the inclosing casing of the hive, each ring being independently removable and having lateral lugs resting on the said parallel bars, and means for clamping the rings in place, comprising the cross-piece $f$ and the screw $e$ by which the rings are forced against the cross-piece $d'$ substantially as described.

3. In combination with the frame, a series of sections or rings carried thereby, constituting the inclosing casing and each being removable independently of the other sections, means for clamping the sections in place side by side in the said frame, and strips for covering the exposed parts of the rings or sections, the said strips being independent of each other and each serving to cover one of the joints between the sections substantially as described.

In testimony that I claim the foregoing as my invention I have signed my name, in presence of two witnesses, this 25th day of November, 1896.

CARL WINTER.

Witnesses:
A. LIEBER,
W. HAUPT.